US012058282B2

(12) United States Patent
Hernandez Mendoza et al.

(10) Patent No.: US 12,058,282 B2
(45) Date of Patent: Aug. 6, 2024

(54) DESK PHONE / HOTEL STATION FOR MOBILE FIRST WORKERS

(71) Applicant: Hewlett-Packard Development Company, LP, Spring, TX (US)

(72) Inventors: Agustin Hernandez Mendoza, Austin, TX (US); Cary Arnold Bran, Vashon, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 354 days.

(21) Appl. No.: 17/212,129

(22) Filed: Mar. 25, 2021

(65) Prior Publication Data
US 2022/0311852 A1    Sep. 29, 2022

(51) Int. Cl.
*H04M 1/02*     (2006.01)
*H04M 1/72412*  (2021.01)

(52) U.S. Cl.
CPC ....... *H04M 1/0297* (2013.01); *H04M 1/0295* (2013.01); *H04M 1/72412* (2021.01); *H04M 1/0202* (2013.01)

(58) Field of Classification Search
CPC ............. H04M 1/0297; H04M 1/0295; H04M 1/72412; H04M 1/0202; H04M 1/04
See application file for complete search history.

(56) References Cited

U.S. PATENT DOCUMENTS 8,612,641 B1 * 12/2013 Bozarth .............. G06F 3/03543
                                                710/65
9,451,648 B2 *  9/2016 Kawakami ............ H04W 12/06

2003/0074405 A1 *  4/2003 Nomura ............. H04N 21/8402
                                                709/204
2012/0297306 A1 * 11/2012 Hassan ................. H04W 76/14
                                                709/228
2014/0351479 A1 * 11/2014 Lee ........................ G06F 13/14
                                                710/303

(Continued)

OTHER PUBLICATIONS

Samsung, "Open a new desktop world with Samsung DeX", www.samsung.com/us/explore/dex/, Jan. 13, 2021.
Samsung, "DEX Pad", www.samsung.com/us/mobile/mobile-accessories/phones/dex-pad-ee-m5100tbegus/, Jan. 13, 2021.
Motorola, "How do I use the Droid Bionic Lapdock?", support.motorola.com/us/en/solution/MS69192, Jan. 13, 2021.

(Continued)

*Primary Examiner* — Angelica Perez
(74) *Attorney, Agent, or Firm* — Quarles & Brady LLP (57) ABSTRACT

A mobile phone station and cellphone application cooperating to provide the complete mobility expected of a cellphone and yet provide a complete desktop experience. In a fully wireless embodiment, the mobile phone station and cellphone application cooperate to automatically connect the cellphone to a Miracast monitor without requiring user operations. After performing initial pairing operations and monitor selection, when the cellphone meets selected criteria, such as the cellphone wirelessly charging or the cellphone within Bluetooth range and autoconnection is selected, the mobile phone station directs the cellphone to automatically start Miracast operations and connect to a selected monitor. In one embodiment, the user simply places the cellphone on the wireless charging pad and the desktop environment is activated. When the user wishes to leave, the user simply picks up the cellphone and walks away, the environment connections ceasing when Bluetooth reception ends.

15 Claims, 8 Drawing Sheets

(56) References Cited

U.S. PATENT DOCUMENTS

| | | | | |
|---|---|---|---|---|
| 2015/0024697 | A1* | 1/2015 | Holtman | G06F 1/1632 |
| | | | | 455/79 |
| 2015/0056920 | A1* | 2/2015 | Huttunen | H04B 7/26 |
| | | | | 455/41.2 |
| 2016/0085713 | A1* | 3/2016 | Glik | H04W 76/14 |
| | | | | 710/304 |
| 2016/0323456 | A1* | 11/2016 | Bernsen | H04W 4/80 |
| 2016/0381135 | A1* | 12/2016 | McGregor | G06F 21/445 |
| | | | | 709/229 |
| 2016/0381202 | A1* | 12/2016 | Koo | G06F 1/1632 |
| | | | | 455/559 |
| 2017/0012821 | A1* | 1/2017 | Sa | H04W 24/04 |
| 2017/0048373 | A1* | 2/2017 | Dees | H04N 21/41407 |
| 2017/0163788 | A1* | 6/2017 | Andersen | H04N 7/142 |
| 2019/0340137 | A1* | 11/2019 | Hall | G06F 1/3231 |
| 2020/0093014 | A1* | 3/2020 | Merenda | H04M 1/72412 |
| 2022/0004306 | A1* | 1/2022 | Reeves | G06F 1/1641 |

OTHER PUBLICATIONS

Plugable Technologies, "Plugable USB-C Phone Cube Docking Station", plugable.com/products/ud-cube-15w/, Jan. 13, 2021.
Samsung, "What is DeX?", www.samsung.com/us/business/solutions/samsung-dex/, Jan. 13, 2021.
Samsung, "The beginner's guide to Samsung DeX", insights.samsung.com/2020/08/05/the-beginners-guide-to-samsung-dex-5/, Aug. 5, 2020.
Motorola, "webtop—Getting Started", support.motorola.com/us/en/solution/MS69278, Jan. 13, 2021.
Plantronics, "Poly Elara 60 Series Data Sheet", 2020, pp. 2.
Plantronics, "Elara 60 WS with Voyager Focus User Guide", 2019, pp. 13.
Samsung, "White paper: A guide to going mobile-only with Samsung DeX", 2020, p. 17.
Wi-Fi Alliance, "Wi-Fi Certified Miracast™ Technical Overview", Jul. 2017. pp. 9.

* cited by examiner

DESK PHONE / HOTEL STATION FOR MOBILE FIRST WORKERS

TECHNICAL FIELD

This disclosure relates generally to connecting cellphones to various peripheral devices.

BACKGROUND

For many years using a full-size keyboard, mouse and monitor required a desktop computer. Over time, the capabilities of laptop computers improved and docking stations were developed to allow use of the full-size keyboard, mouse and monitor to provide the full computing desktop environment. As the laptop computer was still just primarily a computer, making the docking station connection was not particularly inconvenient.

The capabilities of cellphones, particularly higher end cellphones, have increased greatly the last few years. Indeed, many higher end cellphones have the same or greater capabilities than many laptop computers. To make use of these cellphone capabilities, Samsung® developed the DeX platform. Samsung DeX is a software platform that allows the cellphone to provide a desktop computing experience. In one embodiment, a multiport adapter allows the connection of an HDMI® monitor and USB keyboard and mouse, conventional desktop computing peripherals. The DeX platform converts the normal cellphone interface into a more familiar desktop experience. Thus, plugging the multiport adapter into a proper Samsung cellphone allows the user to use the same full-size keyboard, mouse and monitor as a desktop computer, with the combination of the DeX platform and the peripherals providing the user a computing desktop environment. In other embodiments, the keyboard and mouse can connect to the cellphone using Bluetooth®, so that only a simple HDMI adapter connected to the monitor can be used. In yet another embodiment, Miracast® can be used to wirelessly connect the cellphone to Miracast-compatible monitor.

While the DeX platform allows a user to have a desktop experience from a cellphone, similar to that of a laptop, the need to plug in a cable or select Miracast operation and then a Miracast device limits the mobility of the cellphone solution. While connecting a laptop to a docking station is generally acceptable, the greater mobility and flexibility of a cellphone makes a manual connection less desirable. A cellphone conventionally is much more mobile than a laptop computer. A cellphone goes with the user, wherever and whenever the user goes anywhere. A laptop computer, on the other hand, is moved much less often. Connecting and disconnecting a multiport or HDMI adapter each time the user leaves the desk to allow the cellphone to be maintained with the user becomes very inconvenient, leading to less use of the desktop environment. The fully wireless embodiment of Bluetooth keyboard and mouse and Miracast monitor is no different, because the steps to select Miracast and select the proper monitor are equally inconvenient. These inconveniences make the use of the desktop environment, even with a cellphone including the DeX platform, less inviting and thus less likely, effectively mooting many of the advantages of the DeX platform.

Plantronics® has produced a product called the Elara 60 mobile phone station. The Elara 60 mobile phone station includes a headset charging port and a keypad and display used to provide a normal desktop phone interface. A cellphone connects to the Elara 60 mobile phone station using Bluetooth. A wireless charging pad is provided to charge the cellphone. The Elara 60 mobile phone station is limited to phone and Microsoft® Teams® operations.

SUMMARY

A mobile phone station and cellphone application cooperate in an embodiment according to the present invention to provide the complete mobility expected of a cellphone and yet provide a complete desktop computer environment. In a fully wireless embodiment, the mobile phone station and cellphone application cooperate to automatically connect the cellphone to a Miracast monitor without requiring user operations. After performing initial pairing operations and monitor selection, when the cellphone meets selected criteria, such as the cellphone wirelessly charging or the cellphone within Bluetooth range and autoconnection is selected, the mobile phone station directs the cellphone to automatically start Miracast operations and connect to a selected monitor. No cables are required to be connected and no Miracast operations are performed manually to activate the fully wireless embodiment of the DeX platform. In one embodiment, the user simply places the cellphone on the wireless charging pad and a complete desktop environment is activated. When the user wishes to leave, the user simply picks up the cellphone and walks away, the environment connections ceasing when Bluetooth reception ends.

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

In the drawings and the description of the drawings herein, certain terminology is used for convenience only and is not to be taken as limiting the examples of the present disclosure. In the drawings and the description below, like numerals indicate like elements throughout.

Figure 1:
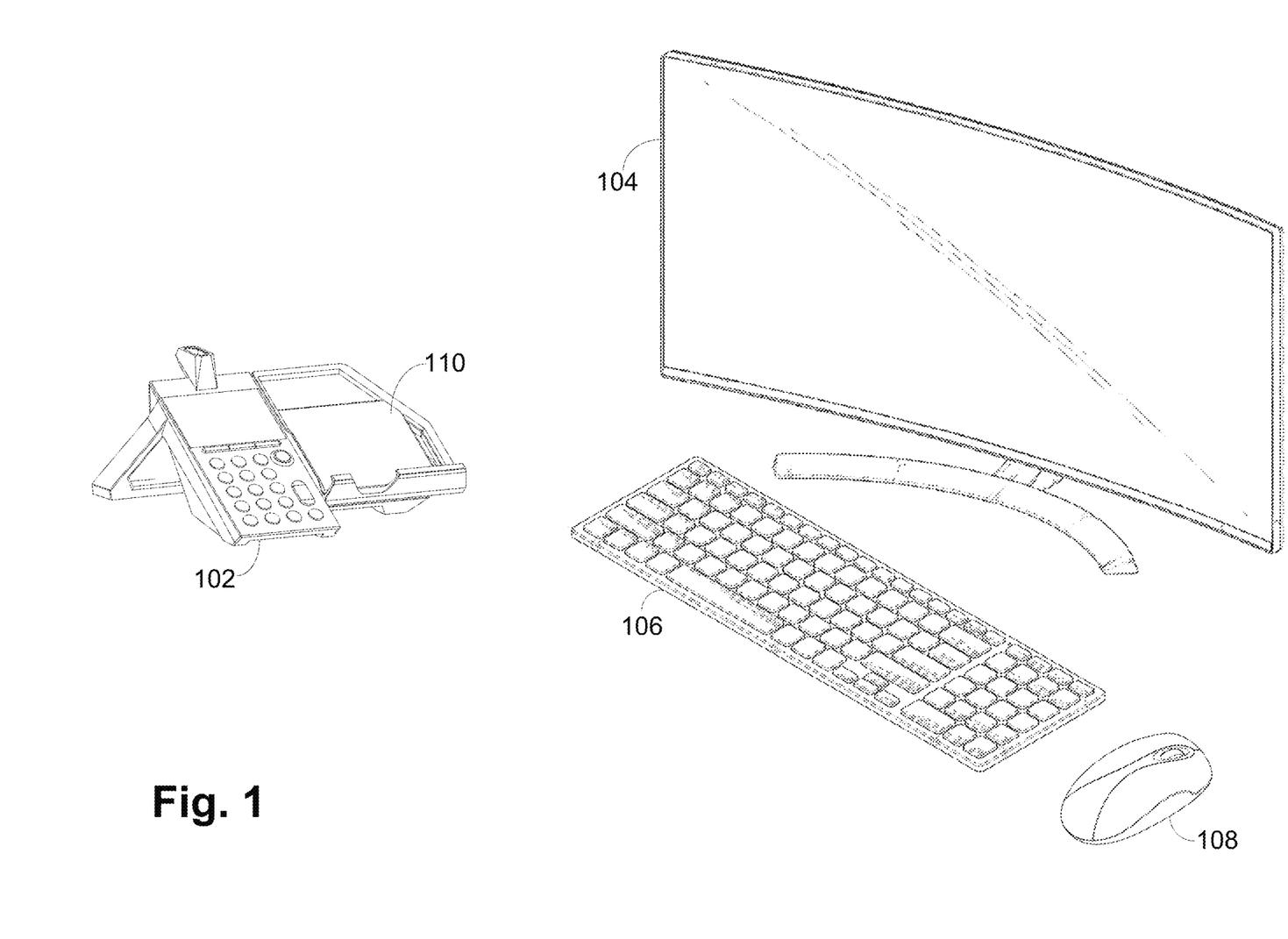
FIG. 1 is an illustration of devices to cooperate with a cellphone to provide a desktop environment.

Referring now to FIG. 1, a mobile phone station 102, a monitor 104, a keyboard 106 and a mouse 108 are illustrated. These four devices are utilized to provide a complete desktop environment to the user of a cellphone. Using just the monitor 104, the keyboard 106 and the mouse 108 with the cellphone provides a computing desktop environment, as the normally present desktop phone is not present. The keyboard 106 and mouse 108 are preferably Bluetooth-connected devices, while the monitor 104 is a Miracast-connected device. The mobile phone station 102 connects to a cellphone using Bluetooth to provide the functions of a desktop phone. The mobile phone station 102 includes a wireless charging area 110 on which to place a cellphone to wirelessly charge the cellphone.

Figure 2:
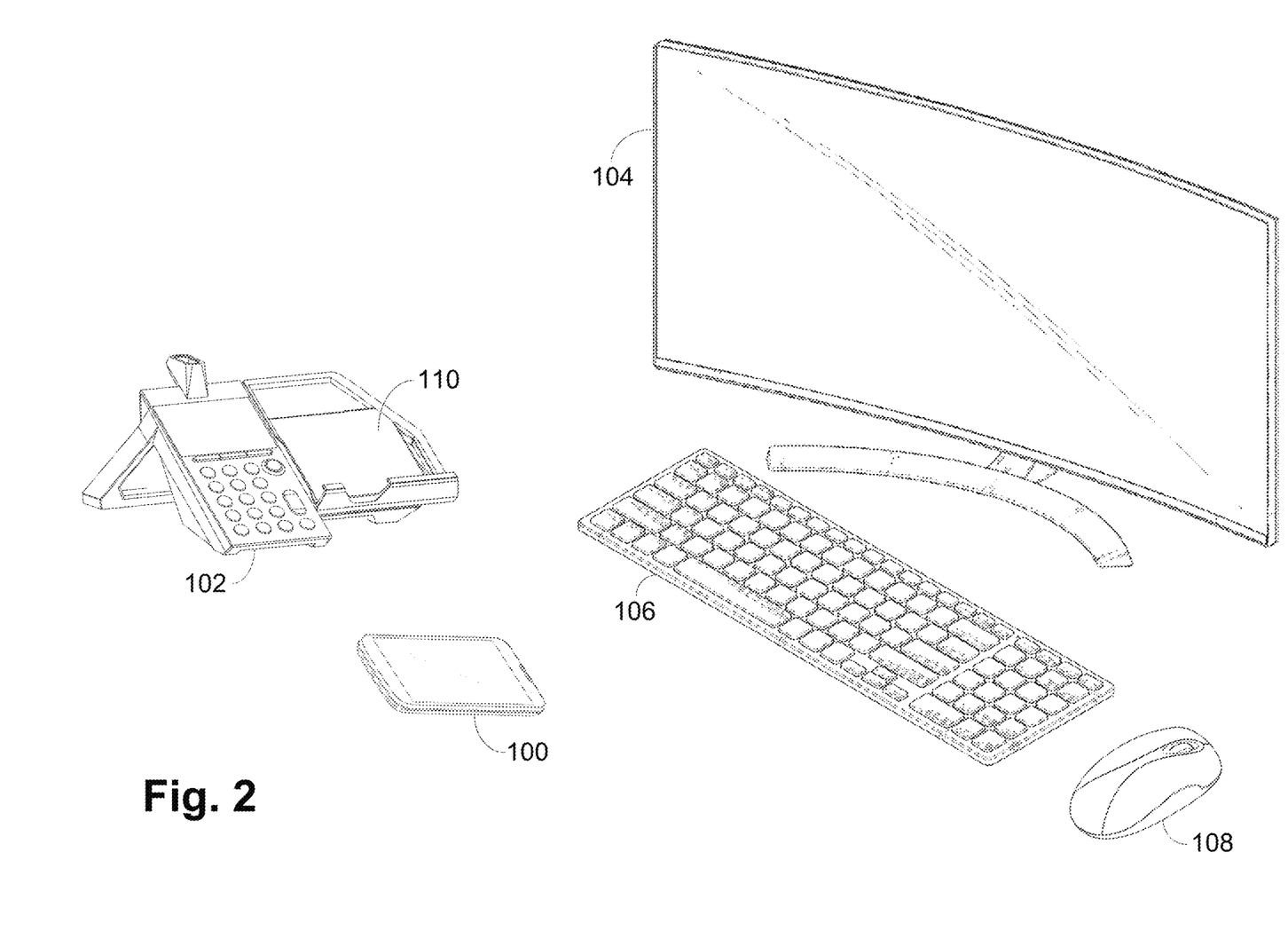
FIG. 2 is an illustration of the devices of FIG. 1 with a cellphone in Bluetooth range.

In FIG. 2, a cellphone 100 is placed on the desk within Bluetooth range of the mobile phone station 102, the monitor 104, the keyboard 106 and the mouse 108. With the cellphone 100 arranged in this location, the cellphone 100 is able to connect with each of the mobile phone station 102, monitor 104, keyboard 106 and mouse 108 to provide full desktop capabilities. In some embodiments, the cellphone 100 provides more complete desktop capabilities according to the Samsung DeX platform but simpler Miracast screen mirroring can also be performed. With the cellphone 100 located as shown in FIG. 2, it is not necessarily the case that the user desires the full desktop environment to be active. Just because the cellphone 100 is within Bluetooth range of the devices does not indicate necessarily indicate a desire for a desktop environment. For example, if the cellphone 100 is in the user's pocket or purse, in many instances a desktop environment might not be desired.

Figure 3:
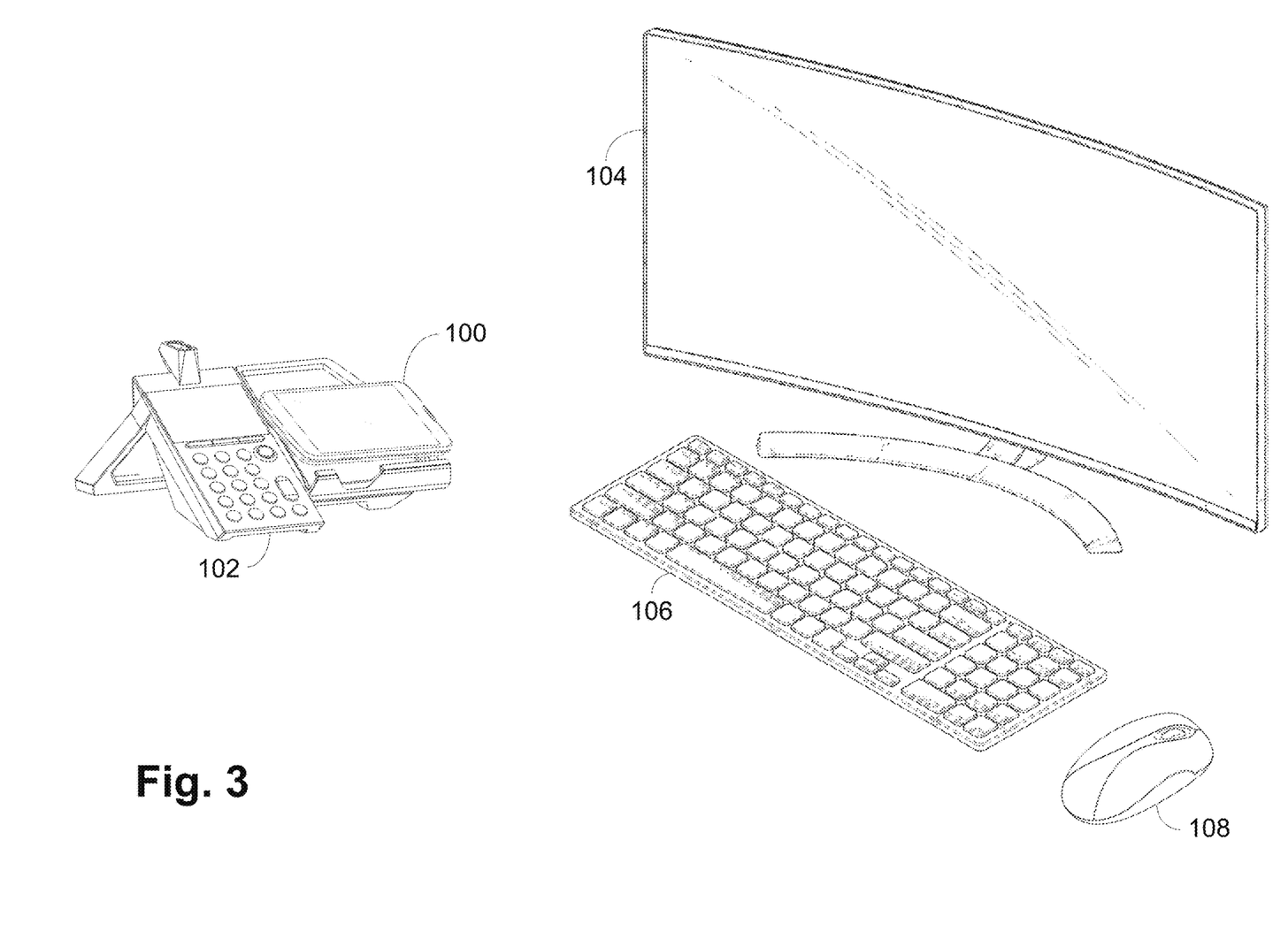
FIG. 3 is an illustration of the devices of FIG. 1 with a cellphone being charged wirelessly.

In FIG. 3, the cellphone 100 is located on the wireless charging area 110. In many embodiments, the placing of the cellphone 100 on the wireless charging area 110 is an indication that the user would like to enable the complete desktop environment and therefore the cellphone 100 is automatically connected to the mobile phone station 102, the monitor 104, the keyboard 106 and the mouse 108 to provide a complete desktop environment using the cellphone 100 as the processing device.

Figure 4:
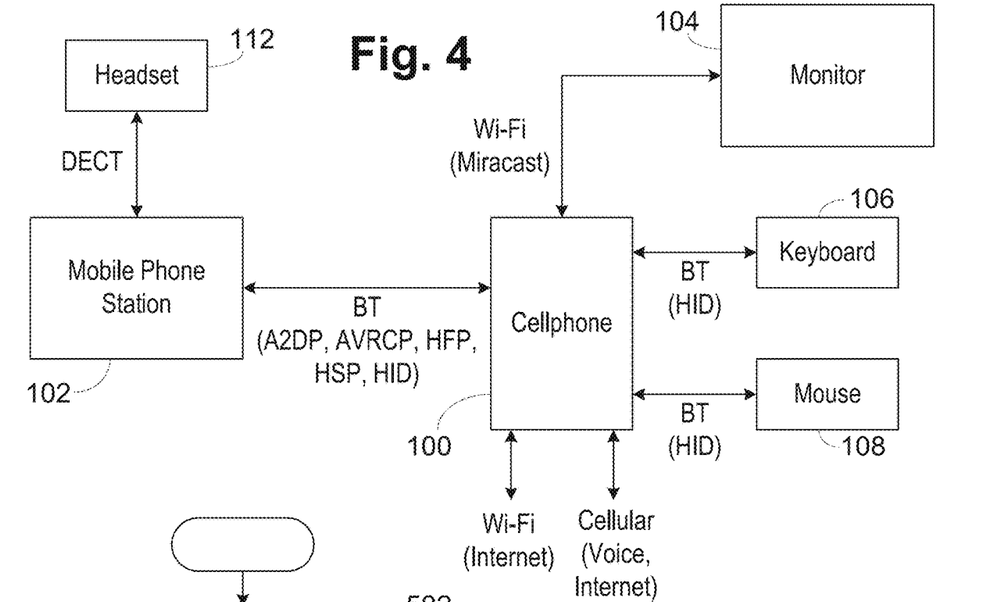
FIG. 4 is an illustration of the connections between a cellphone and the devices of FIG. 1 according to the present invention.

Referring to FIG. 4, the wireless interconnections of the various devices are illustrated. The cellphone 100 connects to the mobile phone station 102 using Bluetooth with the Advanced Audio Distribution Profile (A2DP), Audio/Video Remote Control Profile (AVRCP), Hands-Free Profile (HFP), Headset Profile (HSP) and Human Interface Device Profile (HID) active. This allows music transfer, telephone communication, keyboard and other command transfer and the like. The cellphone 100 is connected to the monitor 104 using a Wi-Fi connection operating according to the Miracast protocol. Cellphone 100 is connected to the keyboard 106 and the mouse 108 using Bluetooth with the HID profile. The cellphone 100 further has a Wi-Fi connection to the Internet and a cellular connection for voice and Internet capabilities. The mobile phone station 102 is connected to a headset 112 using a digital enhanced cordless telecommunications (DECT) wireless connection.

Figure 5:
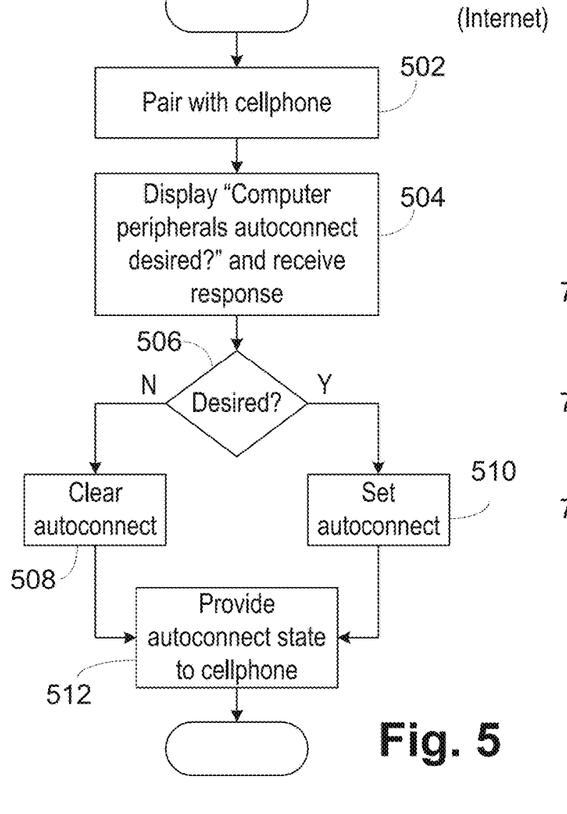
FIG. 5 is a flowchart of pairing operations of a mobile phone station with a cellphone according to the present invention.

Referring now to FIG. 5, operations of the mobile phone station 102 to pair with the cellphone 100 are illustrated. In step 502, pairing operations with the cellphone 100 are performed. After the cellphone 100 is paired with the mobile phone station 102, the mobile phone station 102 displays a query to the user "Computer peripheral autoconnect desired?" to determine if the user would like the cellphone 100 to automatically connect to the monitor 104 and other devices. A user response to the query is received. The user response is evaluated in step 506 and if autoconnect is not desired, in step 508 an autoconnect state is cleared. If autoconnection is desired, in step 510 the autoconnect state is set. In step 512, the autoconnect state is provided to the cellphone 100. In some embodiments, in both cases, setting or clearing the autoconnect state includes storing the identity of the cellphone 100 so that the request does not have to be repeated. In some embodiments, an application on the cellphone 100 can request that the autoconnection state be changed, such as when the monitor 104 is changed so that Miracast device selection must be performed again.

Figure 6:
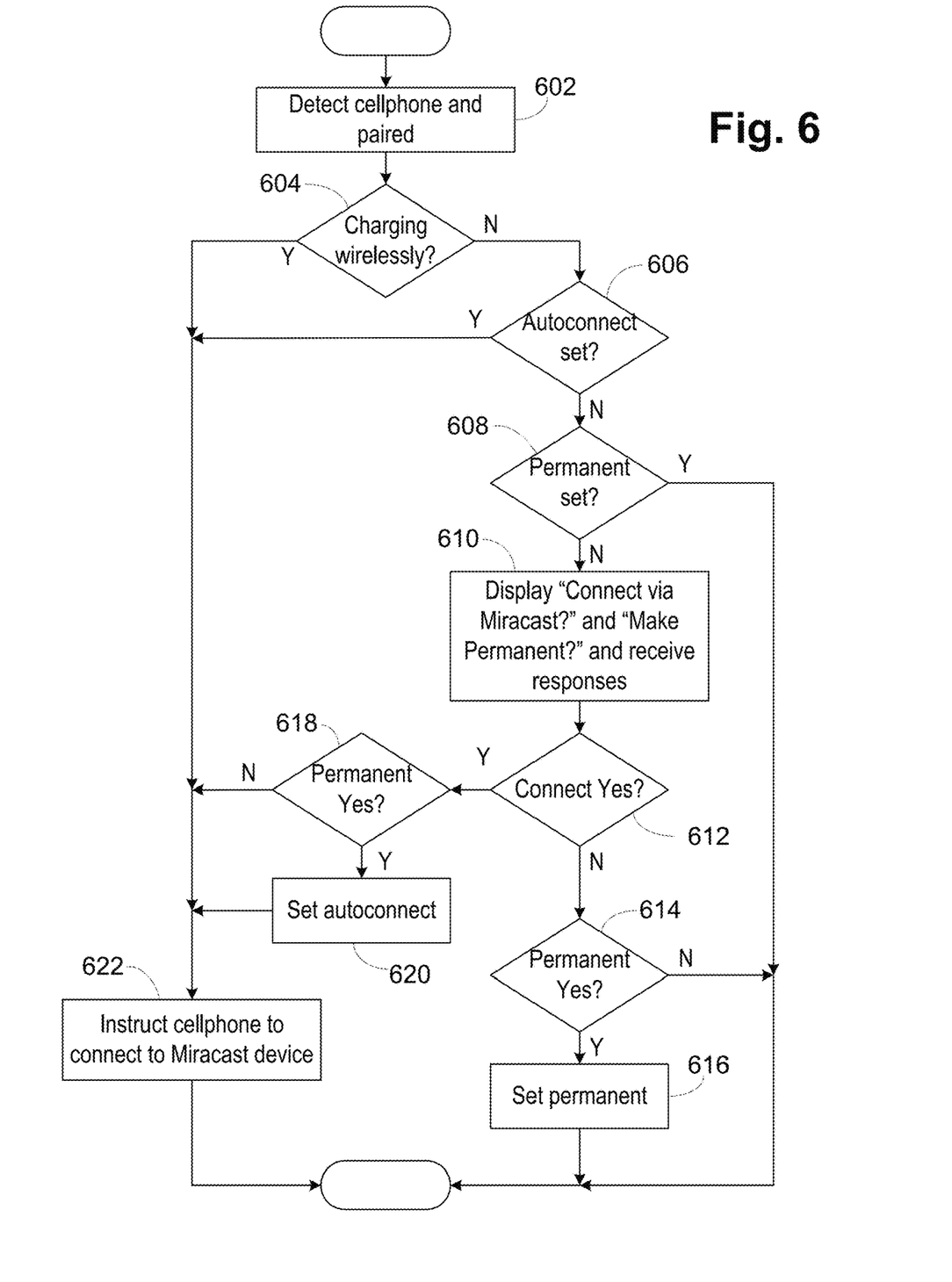
FIG. 6 is a flowchart of mobile phone station operations to have the cellphone automatically connect with the devices of FIG. 1 according to the present invention.

FIG. 6 illustrates operation of the mobile phone station 102 to enable autoconnection of the cellphone 100 with the monitor 104. Automatic connections with the keyboard 106 and mouse 108 are not required to be directed by the mobile phone station 102 as those connections occur automatically under the Bluetooth protocol when the cellphone 100 is within range of the keyboard 106 and mouse 108. In step 602, the mobile phone station 102 detects the paired cellphone 100 over the Bluetooth channel. In step 604, the mobile phone station 102 determines if the cellphone 100 is being charged wirelessly. If not, in step 606 the mobile phone station 102 determines if the autoconnect state is set. If not, in step 608 it is determined if a permanent state is set. If set, then operations proceed normally. If not, in step 6io questions of "Connect via Miracast?" and "Make Permanent?" are displayed by the mobile phone station 102 and user responses are received. The connect user response this is evaluated in step 612. If the user response is do not connect, then in step 614 the permanent user response is evaluated. If the user response is yes, the permanent state is set in step 616 and operations proceed normally. If the user response is no, then operations proceed normally. If the connect user response in step 612 is connect, then in step 618 the permanent user response is evaluated. If the user response is yes, then the autoconnect state is set in step 620.

If the cellphone 100 is charging wirelessly, as determined in step 604, the autoconnect state was determined to be set in step 606 or after steps 618 or 620 if connection by Miracast was desired in step 612, then in step 622 the mobile phone station 102 sends instructions to the cellphone 100 to connect to a Miracast device. Operations then proceed normally.

Figure 7:
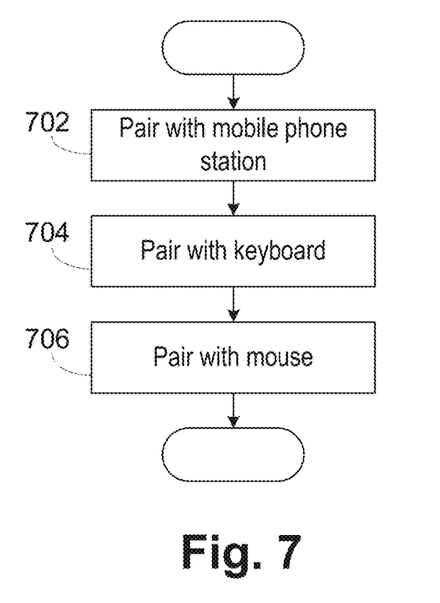
FIG. 7 is a flowchart of cellphone pairing operations according to the present invention.

FIG. 7 illustrates Bluetooth pairing of the cellphone. In step 702, the cellphone 100 pairs with the mobile phone station 102. In step 704, the cellphone 100 pairs with the keyboard 106. In step 706, the cellphone 100 pairs with the mouse 108. It is understood that these three steps can be performed in any order, need not be performed contemporaneously and can be done at any desired time but before desktop operation.

Figure 8:
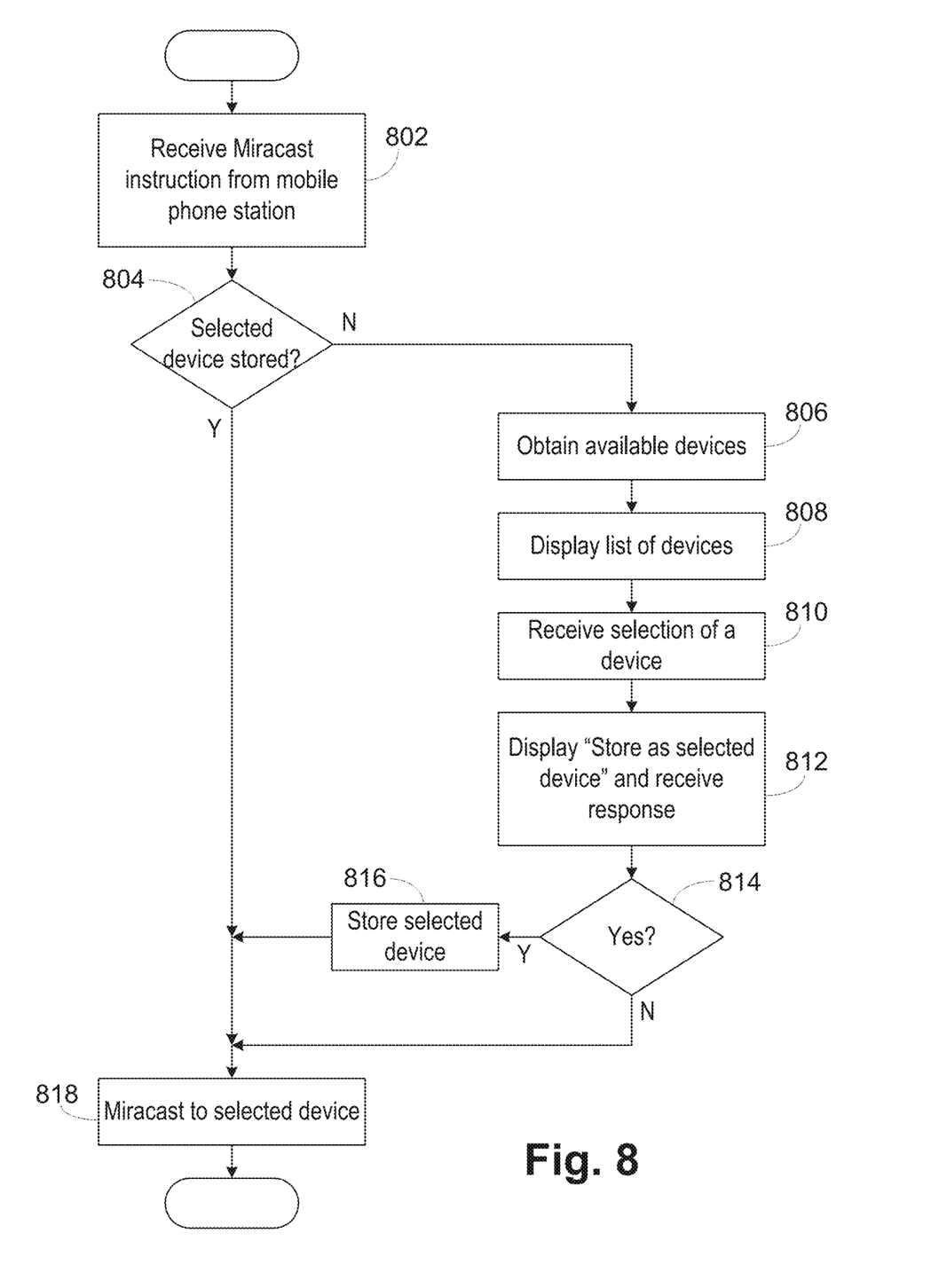
FIG. 8 is a flowchart of cellphone operations to cooperate with the mobile phone station to automatically connect with the devices of FIG. 1 according to the present invention.

FIG. 8 illustrates the operation of the cellphone 100 to automatically connect to the monitor 104 to provide a complete desktop environment automatically. Preferably the cellphone 100 includes an application to cooperate with the mobile phone station 102 to allow the autoconnection of the desktop environment and configure the various settings relating to autoconnection. In step 802, the cellphone 100 receives instructions from the mobile phone station 102 to connect by Miracast. In step 804, the cellphone 100 determines if there is a selected Miracast device stored. If not, in step 806 the cellphone 100 determines the available Miracast devices in the present environment. In step 808, the list of devices is displayed on the cellphone 100. In step 810, the cellphone 100 receives a user selection of a desired device. In step 812, the cellphone 100 then prompts the user with a query "Store as selected device?" and receives a response from the user. In step 814, the response from the user is evaluated and if the indication is to store the selected device, then in step 816 the selected device is stored. If a selected device was stored as determined in step 804, is stored in step 816 or is not desired to be stored in step 814, in step 818 the cellphone 100 connects to the monitor 104 using Miracast.

As discussed above, it is understood that the cellphone 100 will already have connected automatically to the keyboard 106, mouse 108 and mobile phone station 102 automatically upon coming into Bluetooth range. Therefore, when the Miracast connection with the monitor 104 is complete, the cellphone 100 is operating with the complete desktop environment.

Figure 9:
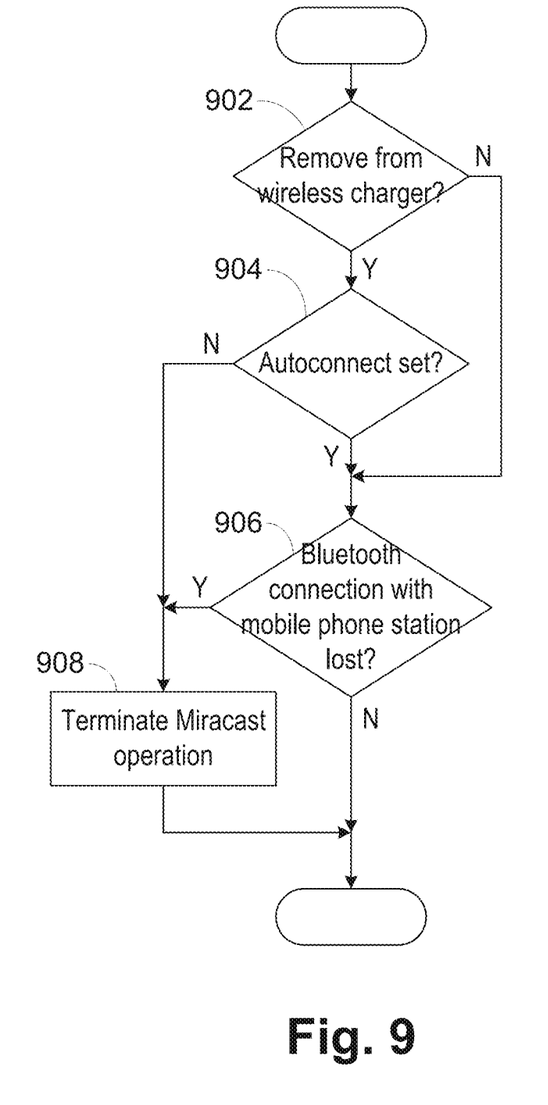
FIG. 9 is a flowchart of cellphone operations to terminate Miracast operation according to the present invention.

Referring to FIG. 9, in step 902, cellphone 100 monitors to determine if it has been removed from the wireless charger. If the cellphone 100 has been removed from the wireless charger, in step 904 the cellphone 100 determines if autoconnect is set. If so, then the Miracast connection is maintained. This allows the user to remove the cellphone 100 from the wireless charger and the desktop environment remain active. If autoconnect is not set, in step 908 the cellphone terminates Miracast operation and the desktop environment is no longer active. If autoconnect is set as determined in step 904 or the cellphone was not removed from the wireless charger, then in step 906 the cellphone 100 determines if the Bluetooth connection with the mobile phone station 102 has been lost. This indicates that the cellphone 100 has been removed from the desk area and the desktop environment ended. This check of step 906 is present in some embodiments as the Miracast connection may have a longer range than the Bluetooth connection, such that the Miracast connection might be maintained even though connections with the mobile phone station 102, keyboard 106 and mouse 108 have been lost. If the Bluetooth connection is lost as determined in step 906, step 908 is performed to end the Miracast connection. If the Bluetooth connection has not been lost, the cellphone 100 is assumed to be in area of the desktop and the desktop environment is maintained active.

Therefore, by the interaction of the mobile phone station 102 and the cellphone 100, using an application on the cellphone 100, the cellphone 100 can connect automatically to the devices used to form a complete desktop environment, not requiring any user interactions after the initial setup operations.

Examples of initial operations and ongoing use are provided here for additional clarity. Presume that the user has already paired the cellphone 100 with the keyboard 106 and mouse 108 and has received a new mobile phone station 102 according to the present invention. In this example, the user does not wish to autoconnect when in Bluetooth range, instead only activating the desktop environment when the cellphone 100 is wirelessly charging. The user initiates Bluetooth pairing on the cellphone 100 and the mobile phone station 102. After pairing is completed, the mobile phone station 102 displays the "Computer peripherals autoconnect desired?" message and the user replies no, so that the autoconnect state is cleared. The user then places the cellphone 100 on the wireless charging area 110 and wireless charging commences. The mobile phone station 102 detects the wireless charging and instructs the cellphone 100 to connect to a Miracast device. The cellphone 100 receives the instruction and no selected Miracast device is stored. The cellphone 100 determines and displays available Miracast devices and the user selects the desired device, such as monitor 104. The cellphone application displays the "Store as selected device?" message and the user responds yes. The selected device is stored for next time. The cellphone 100 commences Miracast operations and the desktop environment is active. After some period of time, the user removes the cellphone 100 from the wireless charging area 110 and leaves the desk area. The cellphone 100 detects the termination of wireless charging and terminates Miracast operation, as autoconnect is not set. Some time later the user returns and places the cellphone 100 on the wireless charging area no. The mobile phone station 102 detects the wireless charging of the paired cellphone 100 and sends the Miracast instruction. The cellphone 100 receives the instruction and immediately begins Miracast operation to the previously selected device and the desktop environment becomes operational. Thus, the second time the user need only place the cellphone 100 on the wireless charging area 110 and the mobile phone station 102 and the cellphone 100 cooperate to start the desktop environment without any further user interactions.

In a second example, the user desires the desktop environment to be active when in Bluetooth range and not wirelessly charging. Again, presume that the user has already paired the cellphone 100 with the keyboard 106 and mouse 108 and has received a new mobile phone station 102 according to the present invention. The user initiates Bluetooth pairing on the cellphone 100 and the mobile phone station 102. After pairing is completed, the mobile phone station 102 displays the "Computer peripherals autoconnect desired?" message and the user replies yes, so that the autoconnect state is set. Because the cellphone 100 is within Bluetooth range, the mobile phone station 102 determines that the cellphone 100 is not charging wirelessly but autoconnect is set, so the Miracast instruction is sent to the cellphone 100. The cellphone 100 receives the instruction and no selected Miracast device is stored. The cellphone 100 determines and displays available Miracast devices and the user selects the desired device, such as monitor 104. The cellphone application displays the "Store as selected device?" message and the user responds yes. The selected device is stored for next time. The cellphone 100 commences Miracast operations and the desktop environment is active. After some period of time, the user removes the cellphone 100 from the desk area. The cellphone 100 detects the loss of the Bluetooth connection with the mobile phone station 102 and terminates the Miracast connection, so that the desktop environment is terminated. When the user returns, the mobile phone station 102 detects the cellphone 100 being in range, even though not on the wireless charging area 110, and instructs the cellphone 100 to start the Miracast connection. In this second example, the second time the user need only bring the cellphone 100 into Bluetooth range and the mobile phone station 102 and the cellphone 100 cooperate to start the desktop environment without any further user interactions.

A third example is similar to the second example, except the cellphone 100 is placed on the wireless charging area 110 when it is paired with the mobile phone station 102. Operation proceeds as in the second example but the user in the third example removes the cellphone 100 from the wireless charging area 110 and places the cellphone 100 on the desk nearby. The cellphone 100 detects the removal from the wireless charger but remains connected over Miracast as the autoconnect state is set. Only when the cellphone loses the Bluetooth connection with the mobile phone station 102 will the Miracast operation be terminated.

Figure 10:
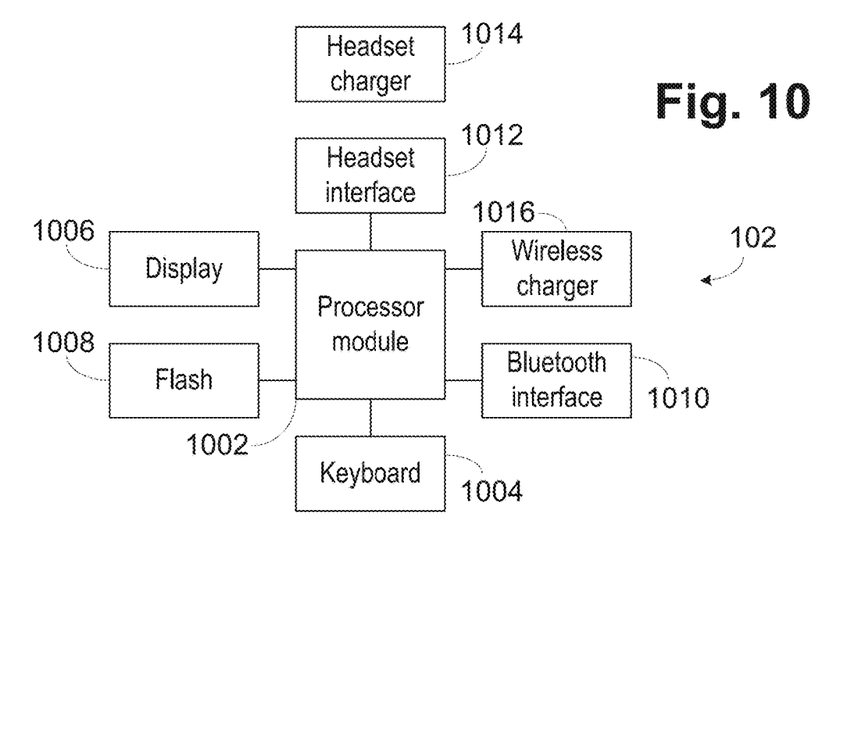
FIG. 10 is a block diagram of a mobile phone station according to the present invention.

Referring now to FIG. 10, a block diagram of the mobile phone station 102 is shown. A processor module 1002 performs the basic processing operations and contains the necessary RAM. A keyboard or user input device 1004 is connected to the processor module 1002, as is a display 1006 and flash memory 1008. The flash memory 1008 stores programs or instructions used by the processor module 1002 to perform the desired operations, including those discussed above relating to autoconnecting the desktop environment with the cellphone 100. A Bluetooth interface 1010 is connected to the processor module 1002 to allow communication with the cellphone 100. A headset interface 1012 is provided to allow interaction with the headset 112. A headset charger 1014 is provided to charge the headset 112. A wireless charger 1016 is connected to the processor module 1002 for operation and so that the processor module 1002 can determine when the cellphone 100 is being charged by the wireless charger 1016.

Figure 11:
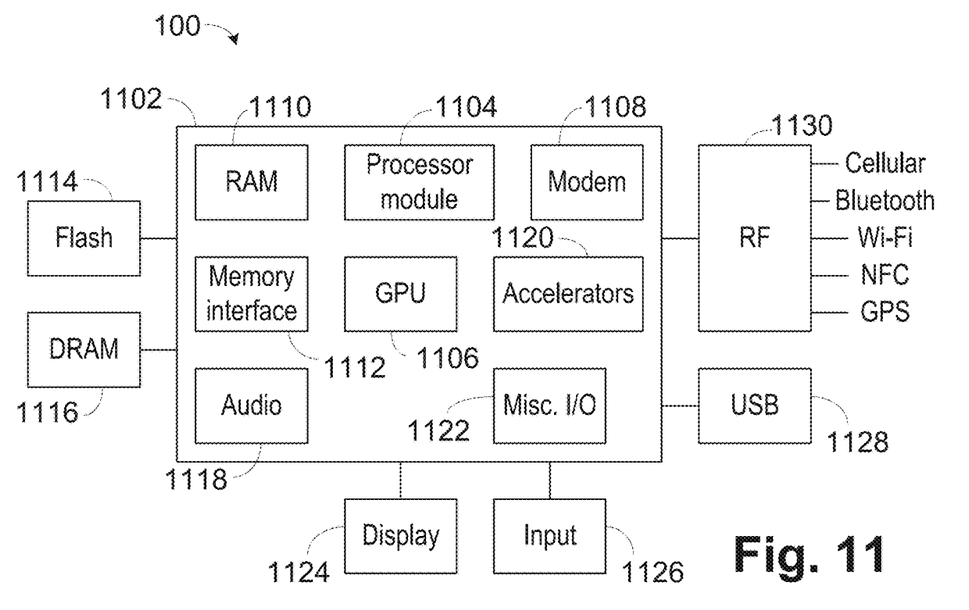
FIG. 11 is a block diagram of a cellphone according to the present invention.

FIG. 11 is an exemplary block diagram of the cellphone 100. A system on a chip (SOC) 1102 provides the primary component of the cellphone 100. The SOC 1102 includes a processor module 1104, which contains CPUs and DSPs. A GPU 1106 is contained in the SOC 1102 to provide basic graphic operations. A modem 1108 is present on the SOC 1102 to provide the computations to allow various wireless communications, such as cellular, Bluetooth, Wi-Fi and the like. RAM 1110 is present on the SOC 1102 to provide operating memory for the processor module 1104. A memory interface 1112 is provided on the SOC 1102 to connect to a flash memory 1114 and DRAM 1116. The flash memory 1114 contains the various programs and instructions utilized by the processor module 1104, the GPU 1106, and the modem 1108 to allow each of the modules to operate to provide cellphone capabilities. These programs include the programs to cooperate with the mobile phone station 102 and provide the above described autoconnect operations. An audio module 1118 is provided on the SOC 1102, as are various accelerator modules 1120 and a miscellaneous input output module 1122. A display 1124 is connected the SOC 1102, as is an input device 1126. A USB connection 1128 is provided to the SOC 1102. An RF section 1130 is connected to the SOC 1102 to provide the radio frequency operations to allow interaction with the cellular, Bluetooth, Wi-Fi, NFC and GPS radio signals. It is understood that this is a very simplistic block diagram of a cellphone and many other variants and block diagrams of cellphones are known and can be developed.

Therefore, as described above, by the interaction of the mobile phone station 102 and the cellphone 100, the fully wireless desktop environment can be activated without user actions, after initial operations. As a result, use of the desktop environment is increased as now the user simply places the cellphone 100 in a desired location and the desktop environment is activated, no further user action required. This automatic operation retains the desired high mobility of the cellphone and maximizes the potential use of the desktop environment.

While a Miracast wireless connection between the cellphone 100 and monitor 104 has been used as the exemplary wireless connection, it is understood that other wireless connections can be used. While a cellphone has been used as the exemplary device, a tablet, laptop or other portable device could be used instead.

A mouse 108 is the exemplary pointing device, but other pointing devices, such as trackballs, trackpads and the like could be used. Similarly, a monitor 104 has been used as the exemplary full size display device but televisions, projectors and other display devices that can connect wirelessly to the cellphone and provide a desktop display can be used as the display device.

Further, while Samsung DeX has been used as the desktop platform, the native operating system and normal display of the cellphone can be used and provide a desktop environment.

Additionally, while a mobile phone station has been used as the exemplary device cooperating with the cellphone to serve as a desktop environment controlling device, it is understood that other devices that can determine the proximity of the cellphone can also be utilized as the desktop environment controlling device. For example, if a wireless charging pad included Bluetooth connectivity with the cellphone, then the wireless charging pad could be used to trigger the automatic connection of the cellphone to the monitor. In another example, a desktop telephone with a Bluetooth connection to the cellphone could be used, even though the desktop telephone did not include a wireless charging pad, so that only Bluetooth connectivity is used for determining the need to activate the Miracast connection. Similarly, a wireless headset base or the monitor could utilize a Bluetooth connection with the cellphone and perform the automatic connection operations of a desktop environment controlling device without the wireless charging operations.

The various examples described are provided by way of illustration and should not be construed to limit the scope of the disclosure. Various modifications and changes can be made to the principles and examples described herein without departing from the scope of the disclosure and without departing from the claims which follow.

The invention claimed is:

1. A method of automatically providing a desktop environment for a portable device, the method comprising the steps of:
wirelessly connecting the portable device to a keyboard and a pointing device;
wirelessly connecting the portable device to a desktop environment controlling device that wirelessly charges the portable device;
providing, automatically upon determining the portable device is wirelessly charging, an instruction from the desktop environment controlling device to the portable device to instruct the portable device to wirelessly connect to a display device;
receiving the instruction from the desktop environment controlling device by the portable device;
setting or clearing an auto-connect state by the portable device;
storing an identity of the portable device by the desktop environment controlling device from setting or clearing the auto-connect state; and
connecting wirelessly to the display device without user interaction.

2. The method of claim 1, wherein the portable device is a cellphone.

3. The method of claim 1, wherein the desktop environment controlling device is a mobile phone station.

4. The method of claim 1, further comprising the step of automatically terminating the wireless connection to the display device by the portable device when the portable device is removed from wirelessly charging.

5. The method of claim 1, wherein the instruction from the desktop environment controlling device to the portable device is provided automatically upon wirelessly connecting the portable device to the desktop environment controlling device.

6. The method of claim 5, wherein the automatically providing the instruction from the desktop environment controlling device to the portable device is a user controllable setting.

7. A desktop environment controlling device comprising:
a processor;
a wireless interface coupled to the processor for wirelessly connecting to a portable device;
memory coupled to the processor for storing programs executed by the processor, the memory storing programs executed by the processor to perform the operations of:
wireless connecting the desktop environment controlling device to the portable device using the wireless interface;
providing an instruction from the desktop environment controlling device to the portable device to instruct the portable device to wirelessly connect to a display device;
receiving the instruction from the desktop environment controlling device by the portable device;
setting or clearing an auto-connect state by the portable device;
storing an identity of the portable device by the desktop environment controlling device from setting or clearing the auto-connect state; and
connecting wirelessly to the display device without user interaction; and
a wireless charger coupled to the processor,
wherein the memory further stores a program to cause the instruction from the desktop environment controlling device to the portable device to be provided automatically upon detecting the portable device wirelessly charging with the wireless charger.

8. The desktop environment controlling device of claim 7, wherein the desktop environment controlling device is a mobile phone station.

9. The desktop environment controlling device of claim 7, wherein the memory further stores a program to cause the instruction from the desktop environment controlling device to the portable device to be provided automatically upon wirelessly connecting the desktop environment controlling device to the portable device.

10. Non-transitory processor readable memories containing programs that when executed cause processors to perform the following method of wirelessly connecting a portable device to a display device without user interaction, the method comprising:
wirelessly connecting the portable device to a desktop environment controlling device;
providing an instruction from the desktop environment controlling device to the portable device to instruct the portable device to wirelessly connect to the display device; and
receiving the instruction from the desktop environment controlling device by the portable device;
setting or clearing an auto-connect state by the portable device;
storing an identity of the portable device by the desktop environment controlling device from setting or clearing the auto-connect state; and
connecting wirelessly to the display device without user interaction,
wherein the desktop environment controlling device includes a wireless charger for the portable device, and
wherein the programs further include a program to cause the instruction from the desktop environment controlling device to the portable device to be provided automatically upon detecting the portable device wirelessly charging with the wireless charger.

11. The non-transitory processor readable memories of claim 10, wherein the portable device is a cellphone.

12. The non-transitory processor readable memories of claim 10, wherein the desktop environment controlling device is a mobile phone station.

13. The non-transitory processor readable memories of claim 10, wherein the programs further include a program to automatically terminate the wireless connection to the display device by the portable device when the portable device is removed from the wireless charger.

14. The non-transitory processor readable memories of claim 10, wherein the programs further include a program to cause the instruction from the desktop environment controlling device to the portable device to be provided automatically upon wirelessly connecting the desktop environment controlling device to the portable device.

15. The non-transitory processor readable memories of claim 14, wherein the programs further include a program to not automatically provide the instruction from the desktop environment controlling device to the portable device based on a user controllable setting.

* * * * *

UNITED STATES PATENT AND TRADEMARK OFFICE
CERTIFICATE OF CORRECTION

| | | |
|---|---|---|
| PATENT NO. | : 12,058,282 B2 | |
| APPLICATION NO. | : 17/212129 | |
| DATED | : August 6, 2024 | |
| INVENTOR(S) | : Agustin Hernandez Mendoza et al. | |

It is certified that error appears in the above-identified patent and that said Letters Patent is hereby corrected as shown below:

In the Specification

Column 6, Line 12, "area no. The" should be --area 110. The--.

Signed and Sealed this
Tenth Day of December, 2024

Katherine Kelly Vidal
*Director of the United States Patent and Trademark Office*